(12) United States Patent
Wehmeier

(10) Patent No.: US 6,712,565 B2
(45) Date of Patent: Mar. 30, 2004

(54) DRILLING DEVICE FOR FRAMELESS GLASSES

(76) Inventor: Reinhard Wehmeier, Bahnhofstrasse 12, Steinhagen 33803 (DE)

( * ) Notice: Subject to any disclaimer, the term of this patent is extended or adjusted under 35 U.S.C. 154(b) by 161 days.

(21) Appl. No.: 10/032,823

(22) Filed: Oct. 25, 2001

(65) Prior Publication Data

US 2002/0122705 A1 Sep. 5, 2002

(30) Foreign Application Priority Data

Oct. 27, 2000 (DE) .......................................... 100 53 518

(51) Int. Cl.⁷ .............................................. B23B 39/00
(52) U.S. Cl. ..................... 408/91; 408/109; 408/110; 408/236
(58) Field of Search .......................... 408/91, 109–111, 408/236, 704, 88

(56) References Cited

U.S. PATENT DOCUMENTS 3,842,376 A * 10/1974 Williams .................... 408/236
5,722,647 A * 3/1998 Rattaro et al. ................ 269/45

FOREIGN PATENT DOCUMENTS

| DE | 19524391 | 1/1996 |
|----|----------|--------|
| DE | 9415834 | 3/1996 |
| JP | 08155806 | 6/1996 |
| JP | 08155945 | 6/1996 |

* cited by examiner

*Primary Examiner*—Daniel W. Howell
(74) *Attorney, Agent, or Firm*—Richard M. Goldberg

(57) ABSTRACT

A drilling device for frameless glasses with a drill head (34), which can be moved up and down. The drill head (34) can be inclined to either side and a holding device (50, 56, 58) is provided for the two lenses of a pair of glasses, in which holding device (50, 56, 58) the opposite edge regions of the lenses are accessible to the drill bit of the dual head (34).

19 Claims, 2 Drawing Sheets

DRILLING DEVICE FOR FRAMELESS GLASSES

BACKGROUND OF THE INVENTION

The invention relates to a drilling device for frameless glasses with a drill head, which can be moved up and down.

For frameless glasses, the temples and bridges are fastened directly to the lenses. For this purpose, fine boreholes must be produced in the two edge regions of the lenses. If the glasses are to be seated correctly and have a good appearance, it is necessary to produce the boreholes relatively accurately in the positions, specified by the manufacturer. In this connection, it is especially important to maintain the specified slope of the boreholes and the distance of the boreholes from the edge of the lenses.

Previously, optometrists generally used a normal drill press with a spherical or ball joint-like holding device for the lenses, on which the lenses are disposed intuitively in relation to slope and position, so that the boreholes correspond as accurately as possible to the desired specifications. It is obvious that inaccuracies are unavoidable with this procedure. In any case, this procedure requires much experience and the expenditure of relatively much time.

SUMMARY OF THE INVENTION

It is therefore an object of the invention to provide a device of the type named above, which permits boreholes to be produced in frameless glasses within a relatively short time and with a high degree of accuracy.

This objective is accomplished by the inventive drilling device, which is characterized in that the drill head can be inclined to either side and in that a holding device is provided for the two lenses of the glasses, in which the opposite edge regions are accessible to the drill bit of the drill head.

The essential data of the boreholes can be taken over especially from the so-called supporting discs. The latter are simple discs of glass or plastic, which imitate the lenses and are mounted at or in the frame, so that the customer can get an impression of the effect of the glasses, while at the premises of the optician.

To begin with, the supporting discs can be clamped in the inventive holding device and fine pins, drills, which are not required, or the like can be inserted in the boreholes, so that the necessary slope of the boreholes can be recognized. This slope can then be transferred by the optician to the drill bit, which is to be used to produce the boreholes, in that the drill head is appropriately inclined laterally. The optician can then approach the position of the drill holes with the drill bit and move the cross slide subsequently until the drill bit has reached the edge of the respective supporting disc. The slope of the borehole and the distance from the edge can then be transferred by the optician in the course of the further procedure to the actual lenses. The drill head must be shifted from the first lens to the second by the optician merely by inclining the drill head to the other side in mirror image fashion. The same applies for the distance from the edge.

Preferably, the drilling device has a base plate, on which the cross slide is disposed. Moreover, an upright guide for the drill head, which can be swiveled about a horizontal axis, is mounted at the base plate. In this way, the slope of the drill head can be varied. Moreover, the drill head can be moved up and down at the guide in the manner basically customary for drill presses.

Preferably, adjustable stops are provided for the inclination of the guide and of the drill head and are located, for example, at a plate, which rises up in front of the guide. The stops can be formed by pins, which are inserted into the boreholes of a series of boreholes.

Advisably, there is a detachable working plate, which forms the actual holding device for the two lenses, on the cross slide. For clamping the lenses, the holding device can be taken down. After the lenses have been inserted precisely, the whole of the working plate, together with the lenses, can be placed back on the cross slide. In this connection, the lower slide preferably is constructed as a longitudinal slide and the upper slide as a transverse slide, in each case in relation to the position of the optician, who is working with the instrument.

The displacements of the transverse slide can be indicated, for example, on a scale, so that the distance, which the drill bit covers from the edge of a lens to the precise drilling position, can be determined. The corresponding applies to the distances, for example, between two superimposed boreholes. Spindle gearing may be provided for shifting the slides.

The holding device may consist simply of an overlay with a high friction, for example of a soft PVC, which is spanned in the positions of the two lenses by clamping straps. Cushions of a soft material, such as moos rubber, may be provided at the clamping straps and exert pressure on the lenses, pressing these against the support without damaging or destroying the glasses.

The whole of the cross slide can also be inclined in the forwards-backwards direction if, in a particular case, the temples are to be mounted obliquely at the lenses. As a rule, however, the cross slide lies horizontally on the machine table.

BRIEF DESCRIPTION OF THE DRAWINGS

In the following, preferred examples of the invention are explained in greater detail by means of the appended drawing, in which.

DETAILED DESCRIPTION

Figure 1:
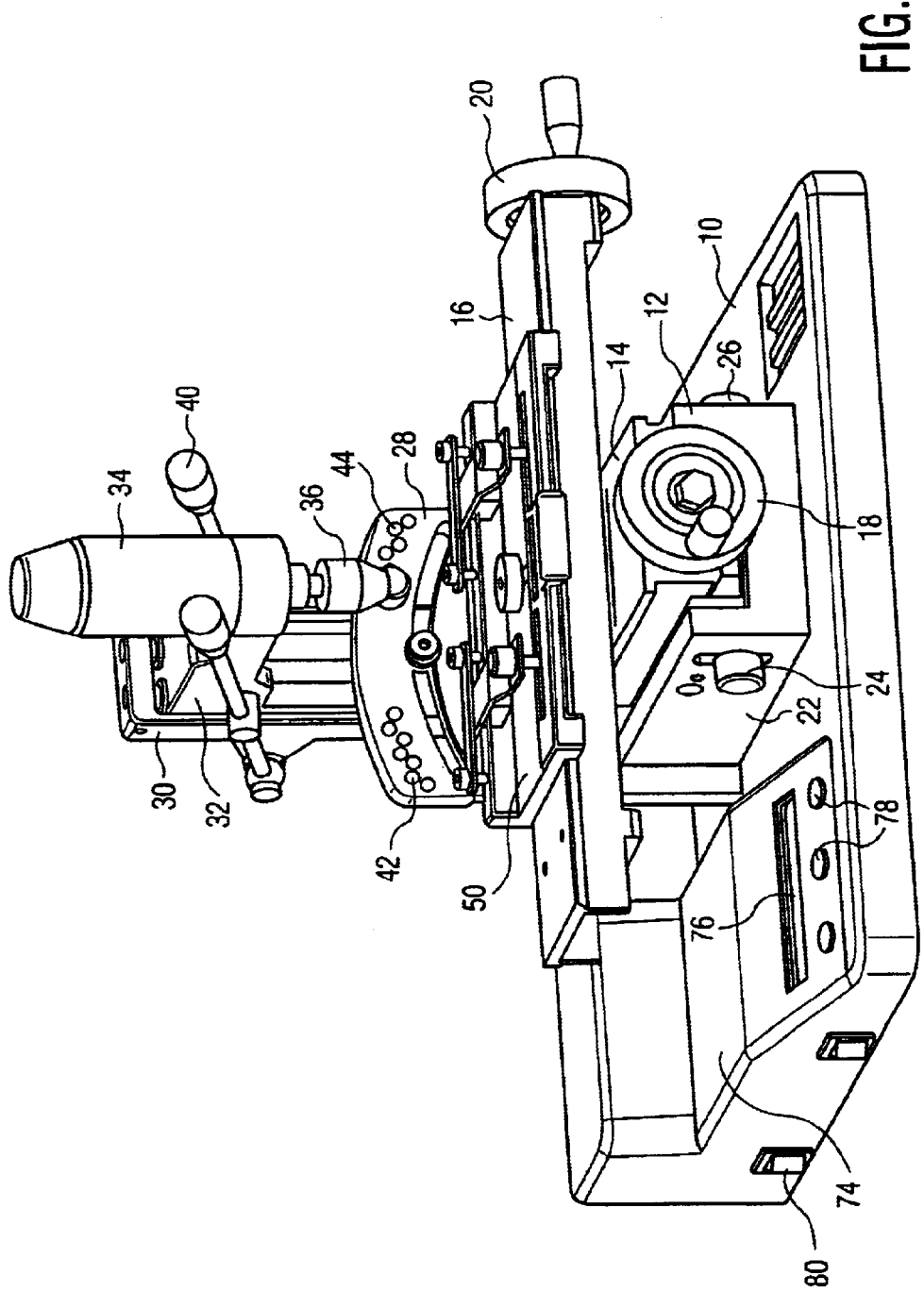
FIG. 1 shows the inventive drilling device in a perspective front view and FIG. 2 shows a corresponding view from the side.

The inventive drilling device comprises a base plate 10, on which a cross slide 12 is disposed. The cross slide 12 comprises a longitudinal slide 14 and a transverse slide 16, which is guided on the longitudinal slide 14. The longitudinal and transverse directions indicated are related to the position of a user, who is in front of the drilling device.

The longitudinal slide 14 and transverse slide 16 can be shifted with the help of hand wheels 18, 20 over spindle gearings, which are not shown. The guide for the longitudinal slide 14, the details of which are not shown, may be inclined in a frame 22, which is firmly mounted on the base plate 10, about a horizontal axis, in the forwards-backwards direction, if two locking screws 24, 26, which can be recognized on the outside of the frame 22, are loosened.

At the back of the frame 22, there is a plate 28, which rises up on the base plate 10 and behind this plate, a guide 30, on which the slide 32 can be moved vertically, rises up. This slide 32 carries a drill head 34 with a drill chuck 36. The drill head 34 can be moved with the help of two levers 38, 40 by the slide 32 vertically at the guide 30. The guide 30, moreover, can be swiveled in a manner not shown about a horizontal axis, which extends in the forwards-backwards direction in relation to the base plate 10 or the plate 28. In the upper region towards both sides, the plate 28 has a row of boreholes 42, 44, which are crowded together tightly. Into one of the boreholes 44, on the right side, a pin 46 is pushed from the front side, its shaft 48 emerging from the back. The shaft 48 acts as stop during the lateral swiveling of the guide 30. The boreholes 42 and 44 are placed so tightly together, that an angular pitch of 2.5° results.

On the transverse slide 16, there is a working plate 50, which can be removed from the transverse slide 16, when a spring-loaded pushbutton 52 is depressed. In this way, the two lenses of a pair of glasses can be mounted on the work plate, before the latter is placed on the transverse slide 16. By these means, the adjustment of the lenses on the working plate is facilitated.

Figure 2:
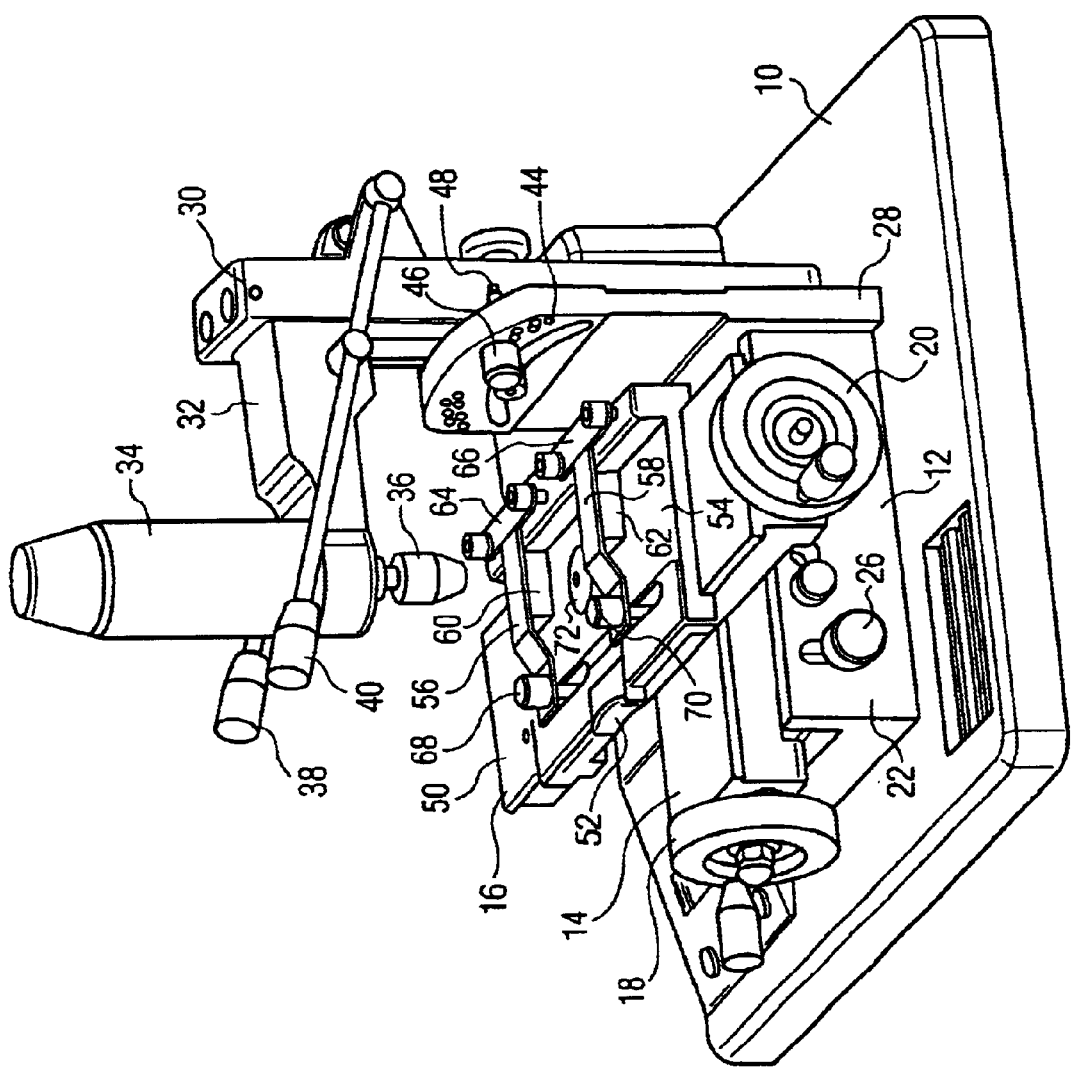

The surface of the working plate is constructed as a support 54 for the lenses and has a high friction, so that the lenses, placed on the support, do not slip to one side. For example, a film of soft PVC can be provided on the surface. For further fixing of the lenses, two clamping straps 56, 58 are provided, at the underside of each of which there is a cushion 60, 62. The clamping straps 56, 58 are supported at the rear side, which is the right side in FIG. 2, below cellular sheets 64, 66, which are held down by bayonet pins 68, 70. Between the two clamping straps 56, 58 on the working plate 50, there is a spacer 72, which can be shifted in the forwards-rearwards direction to adapt to the size of the respective lenses.

As shown in FIG. 1, there is, on the base plate 10, a control console 74 with a display 76 and a number of knobs 78 for initiating the different functions. Furthermore, in this region, switches 80 are provided for switching on the functions of the drilling device. A power pack can also be provided here; however the use of a separate power pack is also possible.

During use of the inventive drilling device, it is possible, for example, to proceed as follows.

To begin with, the supporting disks of the frame, for which the lenses are to be produced, are fastened to the working plate 50 of the drilling device. For this purpose, the bayonet pins 68, 70 initially are twisted, until they can be pulled out of the associated, not marked slide, and the clamping straps 56, 58 are raised. The supporting disks are placed on the support 54 in such a manner, that the cushions 60, 62 of the clamping straps 56, 58 take hold of them essentially in their center. It can be seen that the clamping straps 56, 58 can be shifted laterally within certain limits, so that different lens sizes can be taken into account. Because the soft cushions 60, 62 pushes the supporting disks against the support 54, which has a high friction, the supporting disks are held firmly without any risk that they may slip to the side.

A fine pin, which has the diameter of these boreholes, is now pushed, for example, into at least one of the boreholes of the supporting disks into the space between the clamping straps 56, 58. A drill bit, which is not required at the time, can also be used as pin. This pin shows the inclination of the borehole.

Subsequently, a drill bit, which is not shown, is clamped into the drill chuck 36 of the drill head 34 and inclined by lowering and swiveling the drill chuck, so that it extends parallel to the pin in the borehole of the supporting disk. In this angular position of the guide 30, pins 46 are pushed into the boreholes 42, 44 on both sides, so that the two angular positions of the guide 30, which are required for drilling the mirror image slope of the boreholes of the two lenses, are fixed.

The pin is then removed from the borehole of the supporting disk and the drill bit in the drill chuck 36 is moved to the corresponding borehole. From here, by rotating the hand wheel 20, the transverse slide 16 is moved laterally, until the drill bit reaches the edge of the supporting disk. The distance covered is shown in the display 76. It represents the distance of the boreholes from the edge.

The actual lenses are now placed in the desired positions. The set slope of the drill bit or of the guide 30 is retained and initially the drill bit is moved to the edge of the lenses and the transverse slide is then moved by the previously indicated distance towards the inside in relation to the lenses. Of course, it is possible to work in mirror image fashion at the two sides.

With that, the position and slope of the borehole in the supporting disk is transferred to the lenses. The procedure is similar for the inner and outer edges of the lenses.

What is claimed is:

1. A drilling device for frameless glasses comprising:
   a base plate,
   a cross slide disposed on the base plate,
   a drill head which can be moved up and down, and which can be inclined to either side, the drill head including a drill bit,
   a guide which rises up and can be swiveled about a horizontal axis and at which the drill head can be moved up and down, said guide being mounted at the base plate, and
   a holding device for holding two lenses of a pair of glasses in such a manner that opposite edge regions of the lenses are accessible to the drill bit of the drill head.

2. The drilling device of claim 1, wherein the holding device comprises two clamping straps which overlap the lenses elastically and press the lenses against a support having high friction.

3. The drilling device of claim 1, further comprising adjustable stops for limiting lateral swiveling of the guide and which are provided at the base plate.

4. The drilling device of claim 3, wherein said stops are provided at a plate rising up in front of the guide.

5. The drilling device of claim 3, wherein the holding device comprises two clamping straps which overlap the lenses elastically and press the lenses against a support having high friction.

6. The drilling device of claim 4, wherein the holding device comprises two clamping straps which overlap the lenses elastically and press the lenses against a support having high friction.

7. The drilling device of claim 3, wherein a detachable holding plate forms the holding device for the two lenses, and is disposed on the cross slide.

8. The drilling device of claim 4, wherein a detachable holding plate forms the holding device for the two lenses, and is disposed on the cross slide.

9. The drilling device of claim 3,
   wherein the cross slide comprises a bottom longitudinal slide and a top transverse slide, and
   further comprising spindle gearings for moving the slides.

10. The drilling device of claim 4,
    wherein the cross slide comprises a bottom longitudinal slide and & top transverse slide, and
    further comprising spindle gearings for moving the slides.

11. The drilling device of claim 1, wherein a detachable holding plate forms the holding device for the two lenses, and is disposed on the cross slide.

12. The drilling device of claim 1,
wherein the cross slide comprises a bottom longitudinal slide and a top transverse slide, and
further comprising spindle gearings for moving the slides.

13. The drilling device of claim 12, further comprising a scale for reading at least displacement of the transverse slide.

14. The drilling device of claim 1, wherein the holding device comprises two clamping straps which overlap the lenses elastically and press the lenses against a support having high friction.

15. The drilling device of claim 14, wherein the clamping straps take hold of the lenses in each case with a cushion of soft material.

16. The drilling device of claim 1, wherein the cross slide can be inclined in a forwards-backwards direction about a horizontal axis.

17. The drilling device of claim 11,
wherein the cross slide comprises a bottom longitudinal slide and a top transverse slide, and
further comprising spindle gearings for moving the slides.

18. The drilling device of claim 14, wherein the support having high friction is made from soft polyvinylchloride (PVC).

19. The drilling device of claim 15, wherein the soft material is made from moss rubber.

* * * * *